March 16, 1971   J. P. GRIFFIN   3,570,024
FOLDING CAR BED

Filed Nov. 12, 1968   2 Sheets-Sheet 1

INVENTOR
James P. GRIFFIN

ATTORNEY

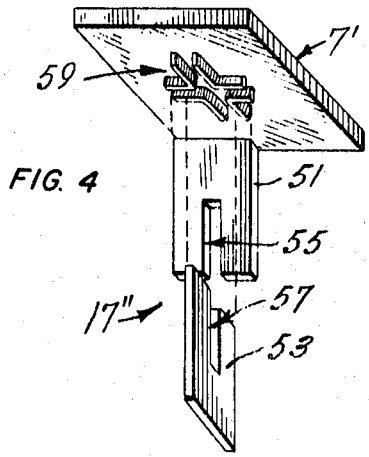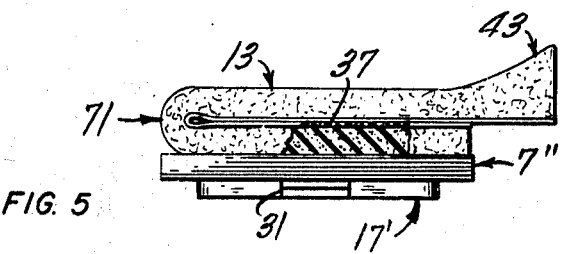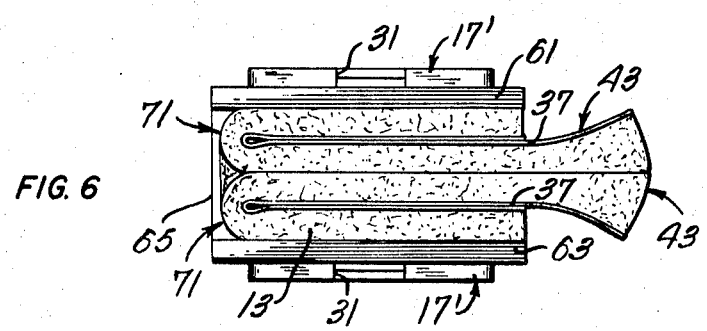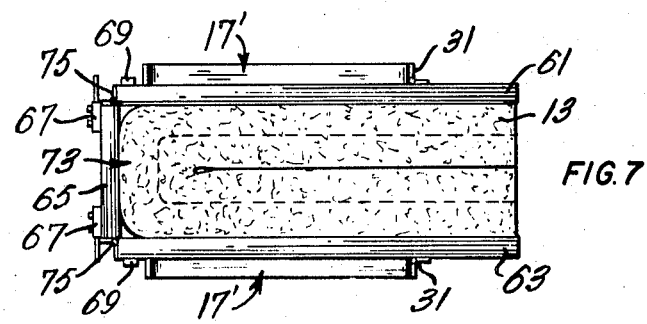
INVENTOR
James P. GRIFFIN
ATTORNEY

United States Patent Office 3,570,024
Patented Mar. 16, 1971

3,570,024
FOLDING CAR BED
James P. Griffin, 535 31st Ave., La Salle,
Quebec, Canada
Filed Nov. 12, 1968, Ser. No. 774,757
Claims priority, application Canada, Oct. 21, 1968,
33,149
Int. Cl. A47c 19/16
U.S. Cl. 5—118                                              9 Claims

ABSTRACT OF THE DISCLOSURE

A portable car bed for cooperation with a seat in a car to form a bed area.

This invention relates to a portable car bed.

The invention is directed toward a portable car bed of the type which is adapted to transform a seat and adjacent leg area of a car into a bed area. The portable car bed is particularly suited for transforming the back seat area of a sedan-type car into a bed area.

More particularly, the invention is directed toward a portable car bed which includes a flat, sectional base member, support means for the base member, a foldable, flat cushion pad of larger area than the base member and an elongated, foldable cushion wedge member. The members and support means are adapted, in a set-up condition, to form a bed area in a car utilizing a car seat with the support means supporting the base member in a horizontal plane in the leg space area adjacent the car seat at a height substantially equal to the height of the edge of the seat; the cushion pad lying in a horizontal plane substantially covering both the base member and the seating surface of the seat; and the wedge member fitting in the corner of the seat under the cushion pad to maintain it in the horizontal plane.

The portable car bed of the present invention is characterized by its simplicity, low cost, minimum storage space requirements when not in use, and the ease with which it may be set up to form the bed area or dismantled.

The invention will now be described in detail having reference to the accompanying drawings in which:

FIG. 4 shows another constructional embodiment of legs used to support the base member; and FIGS. 5, 6 and 7 show a further constructional embodiment of the car bed.

Figure 1:
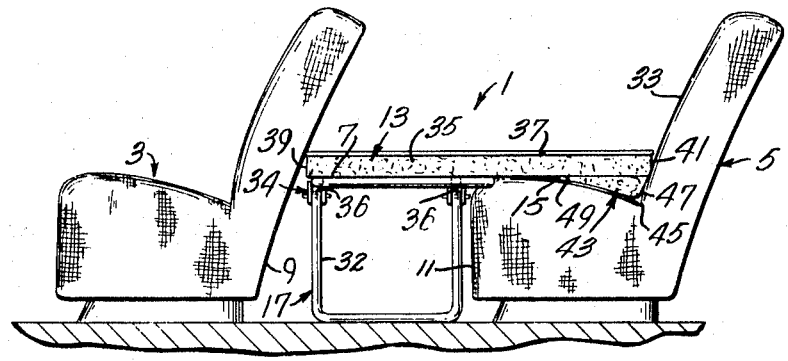
FIG. 1 illustrates the car bed in its set-up condition in relation to the seats in a car.
Figure 2:
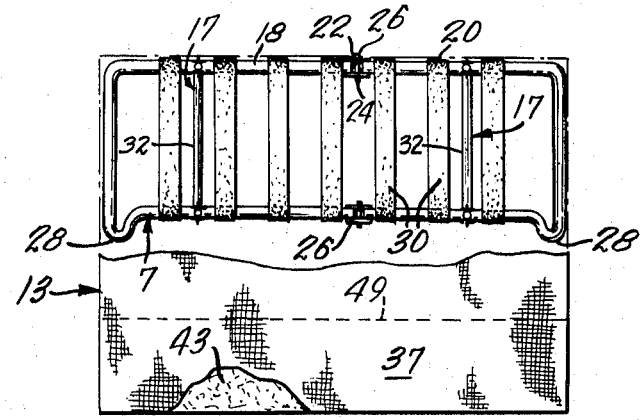
FIG. 2 is a bottom plan view of the portable car bed in its set-up condition.
Figure 3:
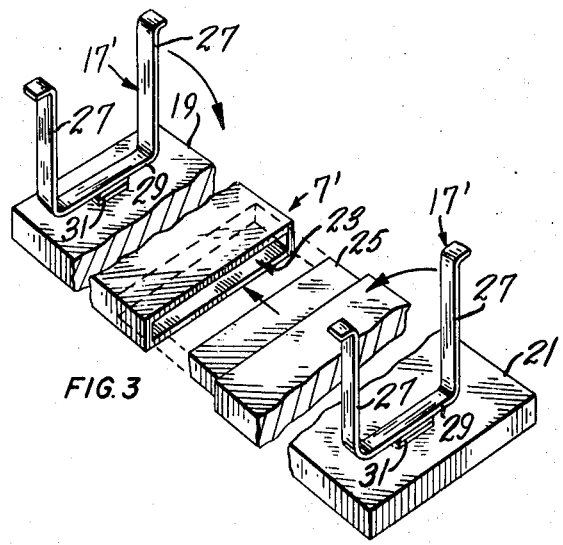
FIG. 3 shows one constructional embodiment of the base member with hinged legs attached thereto.

As shown in FIGS. 1, 2 and 3, the portable car bed 1 of the present invention is adapted to be set up in a car in the leg space between the back of the front seat 3 and the back seat 5 and utilizing the seating surface of the back seat 5.

The car bed includes a sectional base member 7 of a size substantially filling the space between the back 9 of the front seat 3 and the front edge 11 of the back seat 5. The sectional base member 7 is constructed so that it can be reduced in length when not in use to permit compact storage. The base member supports a portion of a foldable, cushion pad 13 placed on top of the base member and the seating surface 15 of the back seat 5. The base member 7 is maintained in its set-up position in a horizontal plane by support means 17 at a height whereby it is substantially level with the edge 11 of the rear seat 5. In its set-up position, the base member 7 is positioned closely adjacent the edge 11 of the rear seat to provide a substantially continuous support surface for the cushion pad 13. The support means 17 may be adjustable in height if desired and can also be pivotally or detachably connected to the base member 7 to permit compact storage of the car bed when not in use.

The base member 7 preferably comprises a lightweight tubular frame as shown in FIG. 2. The frame can comprise two substantially U-shaped main frame members 18, 20 hingedly joined together at the ends of their arms 22, 24 by hinges 26. The base of the U-shaped main frame members can be formed to have a curved lateral extension 28 on one side shaped to fit adjacent the curve of the front corners of the back seat as shown in FIG. 2. Straps or web members 30 of fabric or plastic material extend across the arms of the main frame members to provide support for the foldable cushion pad 13. The hinges 26 permit the support member to be folded in half for storage. The hinges are of the type which lock to maintain the frame members in a horizontal plane in the set-up condition. Alternatively, the main frame members can be slidably interconnected at the ends of their arms 22, 24.

The support means 17 can comprise U-shaped tubular legs 32 hingedly attached by hinges 34 at their free ends 36 to the frame members 18, 20 adjacent the base of the U-shape which legs support the frame in a set-up condition and fold to a position adjacent the frame members for storage.

The base member 7 may also be formed in planar sections of any suitable material such as plywood, fibreboard or plastic having sufficient rigidity to support the weight of a person lying on it. As shown in FIG. 3, the base member 7' can alternatively comprise two approximately equal sized rectangular plastic sections 19 and 21 with an opening 23 formed in one end of one section 19 to receive a tongue-like portion 25 on the other section 21 in sliding interconnection. This sliding interconnection provides easy set-up of the base member and allows its length to be adjusted to the width of the car. The base member can be easily disconnected into two pieces to provide compact storage.

Support means 17', for use with planar base member 7', can as shown in FIG. 3, be formed from a plastic or metal strip shaped to form legs 27 connected by a central portion 29. The central portion 29 of each support member is hingedly connected to each section 19, 21 of the base member by hinges 31. The hinges 31 permit the legs 27 to be folded flat, as shown by the arrows in FIG. 3, adjacent the sections 19, 21 during storage.

The foldable cushion pad 13, in the set-up condition rests in a horizontal plane on the top of the base member 7 and extends over the seating surface 15 of the rear seat 5, its area being such as to substantially fill the space between the back 9 of the front seat 3, the front of the back support 33 of the rear seat 5, and the side walls of the car. The cushion pad may be made of a layer 35 of foam rubber material or any other suitable cushioning material and of a thickness to provide cushioned support. The cushion layer 35 can be covered with a fabric covering 37 if desired. The cushion pad 13 preferably covers the entire base member 7 with one edge 39 aligned with an edge of the base member 7 as shown in FIG. 1. The cushion pad extends rearwardly from the base member to cover the seating surface 15 of the rear seat 5 with its opposite edge 41 positioned closely adjacent back support 33 of rear seat 5.

Adjacent the opposite edge 41 of the cushion pad 13, there is provided an elongated, foldable support wedge 43 which is shaped to approximately fit the corner 45 of the back seat 5 to maintain the cushion pad 13 in a flat horizontal position. The wedge 43 has a maximum thickness 47 adjacent the opposite edge 41 of the cushion pad and tapers to a minimum thickness 49 spaced from the edge 41. The wedge member 43 may or may not be attached to the pad and is made of the same material as the pad. Both the cushion pad 13 and the wedge 43 are made of material which allows them to be folded when not in use to reduce storage space requirements.

The sectional base member 7, the foldable support means 17, the foldable cushion pad 13 and foldable wedge 43 combine with the back seat 5 to transform the back seat space in a car into a sleeping area when set-up in cooperating relationship and the members are constructed to be stored in a compact space when not required.

The bed members may be constructed in other ways while still retaining its simplicity and portability. For example, the base member 7' made of planar sections of plastic can be formed in two sections centrally hinged together transversely of its length so that the sections can be folded facing each other for storage. In the set-up condition, locking means can be provided to prevent collapse of the base member when the two pieces are unfolded about the central hinge to lie in a flat plane.

FIG. 4 illustrates another embodiment of the support means 17" which can be used with the planar base member 7' shown in FIG. 3. Each support means can be formed from two interlocking pieces 51, 53 which interlock in a cross-shape form through sliding connection permitted by central, longitudinally extending slots 55, 57 formed in the pieces. A cross-shaped receiving slot 59 can be formed on the bottom surface of each section of the support member, preferably by molding when the support member is made out of plastic material. This cross-shaped slot 59 receives an end of the cross-shaped form defined by the assembled pieces 51, 53, and the form provides support for the base member 7' in the set-up condition. The cross-shaped form sits loosely in the slot and can be easily removed and disassembled to permit compact storage of the support means.

In a further embodiment of the invention shown in FIGS. 5 6 and 7, the base member 7" may be constructed in three sections, two larger outer sections 61, 63 and a narrow central section 65 all hingedly connected together as shown in FIG. 7. The cushion pad 13 preferably is attached to the base member 7" by adhesive or other suitable means and the wedge member 43 is integrally formed with the pad as shown in FIG. 5. The sections forming the base member can be provided with sliding bolts 67 and locks 69 or other suitable locking means to prevent collapse of the base member 7" when in the set-up flat condition. The support members 17 are preferably connected to the outer sections 61, 63 by hinges 31. In this embodiment all the members of the portable bed are always joined to each other whether the bed is in a set-up condition or storage condition. The bed is easily stored in a compact position by folding the cushion pad back double along a first fold line 71 as shown in FIG. 5 and then folding the outer sections 61, 63 about hinges 75 connecting them to the center section 65 so that they face each other. Folding the outer sections about center section 65 causes folding of the doubled cushion pad a second time about a second fold line 73 and the outer sections encompass the twice folded cushion member therebetween as shown in FIGS. 6 and 7. The center section 65 of the base member 7" is of a width substantially the same as the thickness of the twice folded cushion pad 13, or four times the width of the pad thickness.

I claim:

1. A portable car bed comprising a rigid, planar base member made of at least two rigidly inter-connectable sections; two rigid, spaced apart support means for the base member; a one-piece foldable, uniform thickness pad member made of cushionable material, larger in area than the base member; and an elongated, foldable wedge member made of cushionable material; the members and support means adapted, in a set-up condition, to form a bed area in a car utilizing a car seat with the two rigid support means supporting the rigid base member in a horizontal plane in the leg space area adjacent the car seat at a height substantially equal to the height of the edge of the seat; the pad member lying in a horizontal plane substantially covering both the base member and the seating surface of the seat; and the wedge member fitting in the corner of the seat under the pad member to maintain it in the horizontal plane.

2. A portable car bed as claimed in claim 1, wherein one edge of the pad member covering the base member is aligned with an edge of the base member and the wedge member is located under the opposite edge of the pad member in the set-up condition, the wedge member tapering in thickness from a maximum adjacent the opposite edge to a minimum spaced from the opposite edge.

3. A portable car bed as claimed in claim 1, wherein the base member is formed in two sections slidably, detachably interconnected to permit separation of the sections in a knockdown condition and to permit adjustment of the length of the base member when in the set-up condition.

4. A portable car bed as claimed in claim 1, wherein the base member is formed in two sections centrally hinged together to permit the sections to fold facing one another in a knockdown condition and including means for locking the sections in an unfolded flat set-up condition.

5. A portable car bed as claimed in claim 4, wherein the two sections of the base member are formed from tubular material, each section being substantially U-shaped and hinged together at the free ends of their arms, and including straps joined to the arms of each member and extending across the member.

6. A portable car bed as claimed in claim 1, wherein the base member is formed from a narrow central rectangular section and two larger outer rectangular sections hingedly connected together to permit the outer sections to fold to a knockdown position facing one another and spaced from one another by the narrow central section, and including means for locking the sections together when in their unfolded set-up condition to maintain the sections in a flat plane.

7. A portable car bed as claimed in claim 6, wherein the cushion pad is attached to the sections of the base member, the wedge is formed integrally with the pad, and the support means are hingedly connected to the outer sections, the narrow central section having a width substantially four times the thickness of the pad.

8. A portable car bed as claimed in claim 4, wherein the means supporting the base member comprises a leg hinged to each section of the base member and foldable from a position lying adjacent a surface of the sections in a knockdown condition to a position perpendicular to the section to support the base member when in the set-up condition.

9. A portable car bed as claimed in claim 3, wherein the means supporting the base member comprises slidably interlocking pieces joined in a cross-shape form and a cross-shaped receiving slot formed on the undersurface of each section to receive the cross-shaped form to support the base member in the set-up condition.

References Cited

UNITED STATES PATENTS

| 2,648,072 | 8/1953 | De Blieux | 5—94 |
| 2,696,246 | 12/1954 | Putnam | 5—94X |
| 2,727,564 | 12/1955 | Gruber | 248—164UX |
| 3,147,497 | 9/1964 | Diaz | 5—132X |
| 3,235,038 | 2/1966 | Nesslinger | 248—166X |

BOBBY R. GAY, Primary Examiner

J. C. MITCHELL, Assistant Examiner

U.S. Cl. X.R.

5—94